US006648080B1

(12) United States Patent
Liao

(10) Patent No.: US 6,648,080 B1
(45) Date of Patent: Nov. 18, 2003

(54) IMPACT DEVICE FOR A PNEUMATIC TOOL

(76) Inventor: Chi-Shen Liao, No. 250, Cheng-Kung 2 Rd., Da-Li City, Taichung Hsien (TW)

( * ) Notice: Subject to any disclaimer, the term of this patent is extended or adjusted under 35 U.S.C. 154(b) by 0 days.

(21) Appl. No.: 10/414,108

(22) Filed: Apr. 16, 2003

(51) Int. Cl.[7] .................................................. B23Q 5/00
(52) U.S. Cl. ......................... 173/93.5; 173/93; 173/176
(58) Field of Search ......................... 173/93, 93.6, 176, 173/216, 93.5, 179; 81/54, 429

(56) References Cited

U.S. PATENT DOCUMENTS

| | | | | | |
|---|---|---|---|---|---|
| 5,379,851 | A | * | 1/1995 | Huang | 173/93 |
| 5,435,398 | A | * | 7/1995 | Juan | 173/176 |
| 5,740,892 | A | * | 4/1998 | Huang | 173/93 |
| 5,887,666 | A | * | 3/1999 | Chen et al. | 173/93 |
| 5,915,484 | A | * | 6/1999 | Hsieh | 173/176 |
| 5,941,319 | A | * | 8/1999 | Juan | 173/93.5 |
| 6,119,794 | A | * | 9/2000 | Chen | 173/93.5 |
| 6,186,247 | B1 | * | 2/2001 | Wang | 173/93 |
| 6,283,226 | B1 | * | 9/2001 | Chen | 173/176 |

* cited by examiner

*Primary Examiner*—Scott A. Smith
(74) *Attorney, Agent, or Firm*—Rabin & Berdo, P.C.

(57) ABSTRACT

An impact device has a carrier, a hammer, a pivot pin, two hammer pins and an output axle. The carrier has a bridge and two walls. Two depressions are defined in the bridge. An elongated hole is defined each wall. The hammer is pivotally mounted in the carrier through the pivot pin. Two legs respectively extend from the hammer to define a recess with an opening. A cavity is defined in each respective leg and corresponds to one of the depressions. An impact protrusion is formed on each respective leg to narrow the opening of the recess. Each hammer pin is moveably received in one of the depressions and the corresponding cavity. The output axle has a jaw selectively abutting against one of the impact protrusions on the hammer. Accordingly, an impact device with a durable structure is provided.

3 Claims, 6 Drawing Sheets

IMPACT DEVICE FOR A PNEUMATIC TOOL

BACKGROUND OF THE INVENTION

1. Field of the Invention

The present invention relates to an impact device, and more particularly to an impact device for a pneumatic tool and that has a durable structure.

2. Description of Related Art

An impact device is mounted in certain pneumatic tools to connect a tool head sleeve to a rotor in the pneumatic tool to make the sleeve rotate with the rotor in a desired direction; With reference to FIG. 5, a conventional impact device (60) for a pneumatic tool in accordance with the prior art comprises a carrier (61), two hammer pins (63), two hammers (62) and an output axle (64). The carrier (61) is connected to a rotor (65) in the pneumatic tool to rotate with the rotor (65). The hammer pins (63) extend into the carrier (61) in parallel. The hammers (62) are mounted in the carrier (61) and respectively engage with the hammer pins (63). Each respective hammer (62) has an engaging hole (not numbered) defined through the hammer (62). An impact protrusion (not numbered) is formed on the inner surface of the engaging hole in each respective hammer (62). The output axle (64) is inserted into the carrier (61) and extends through the engaging holes in the hammers (62). Two jaws (641) are formed on the output axle (64) and correspond to the impact protrusions in the engaging holes of the hammers (62).

When the rotor (65) is rotated by compressed air supplied from a pneumatic source and applied to the pneumatic tool, the carrier (61) will rotate with the rotor (65). The hammers (62) will rotate with the carrier (61) due to the engagements between the hammers (62) and the hammer pins (63). The impact protrusion in the engaging hole of one of the hammers (62) will engage with the corresponding jaw (641) on the output axle (64), and the impact protrusion in the engaging hole of the other hammer (62) will be kept from engaging with the other jaw (641) on the output axle (64). Consequently, the output axle (64) will be driven to rotate with the carrier (61) through the hammer (62) engaging with the corresponding jaw (641). A tool head sleeve (not shown) mounted on the output axle (64) will be rotated to tighten or to loosen a fastener, such as a nut or a bolt.

When the rotor (65) is rotated in a reverse direction, the output axle (64) will be driven to rotate in the revere direction through the other hammer (62) engaging with the other jaw (641) on the output axle (64).

However, only one hammer (62) engages with the jaw (641) on the output axle (64) to drive the output axle (64) to rotate in a desired direction, so only one hammer pin (63) engaging with the driving hammer (64) bears the entire load applied to or supplied from the output axle (64). The other hammer pin (63) will be kept free from loading during the operation of the impact device. The hammer pins (63) of the conventional impact device are easily broken and damaged due to the considerable loading, and the useful life of the conventional impact device is short.

With reference to FIG. 6, another conventional impact device (70) for a pneumatic tool in accordance with the prior art comprises a carrier (71), a connector (73), a hammer (72), a pivotal pin (74) and an output axle (76). The connector (73) is mounted in the carrier (71) and is connected to a rotor (75) of the pneumatic tool to rotate with the rotor (75). A notch (not numbered) is defined in the connector (73). The hammer (72) is mounted in the carrier (71) and has a semicircular cross section. A tongue (not numbered) extends from the hammer (72) and engages with the notch in the connector (73), such that the hammer (72) can rotate with the connector (73). The pivot pin (74) extends through the carrier (71) and the hammer (72) with the tongue (72) to pivotally connect the hammer (72) to the carrier (71). The output axle (76) is inserted into the carrier (71) and has a jaw (761) with a semicircular cross section to abut against the hammer (72).

When the rotor (75) is rotated by compressed air supplied from a pneumatic source and applied to the pneumatic tool, the output axle (76) will rotate with the rotor (75) through the transmission of the connector (73) and the hammer (72).

However, as the pivot pin (74) of the conventional impact device must bear the load applied to or supplied from the output axle, the pivot pin (74) is also easily broken or damaged when a large external force is applied to the output axle (76).

To overcome the shortcomings, the present invention tends to provide an impact device to mitigate or obviate the aforementioned problems.

SUMMARY OF THE INVENTION

The main objective of the invention is to provide an impact device for a pneumatic tool and having a durable structure to elongate the useful life of the impact device. The impact device has a carrier, a hammer, a pivot pin, two hammer pins and an output axle. The carrier is adapted to be connected to the rotor and has a bridge and two walls. Two depressions are defined in the top of the bridge. An elongated hole is defined each respective wall of the carrier. The hammer is pivotally mounted in the carrier between the walls through the pivot pin. Two legs respectively extend from the hammer to define a recess with an opening in the hammer. A cavity is defined in each respective leg and corresponds to one of the depressions in the bridge. An impact protrusion is formed on each respective leg to narrow the opening of the recess. The pivot pin extends through the elongated holes in the walls of the carrier and the hammer to pivotally connect the hammer to the carrier. Each hammer pin is moveably received in one of the depressions in the bridge and the corresponding cavity in the hammer. The output axle is inserted into the carrier and has a jaw longitudinally formed on the output axle and selectively abutting against one of the impact protrusions on the hammer. With such an impact device, all of the hammer pins can bear the load applied to or supplied from the output axle. The impact device has a durable structure, and the useful life of the impact device is prolonged.

Other objects, advantages and novel features of the invention will become more apparent from the following detailed description when taken in conjunction with the accompanying drawings.

DETAILED DESCRIPTION OF PREFERRED EMBODIMENT

Figure 1:
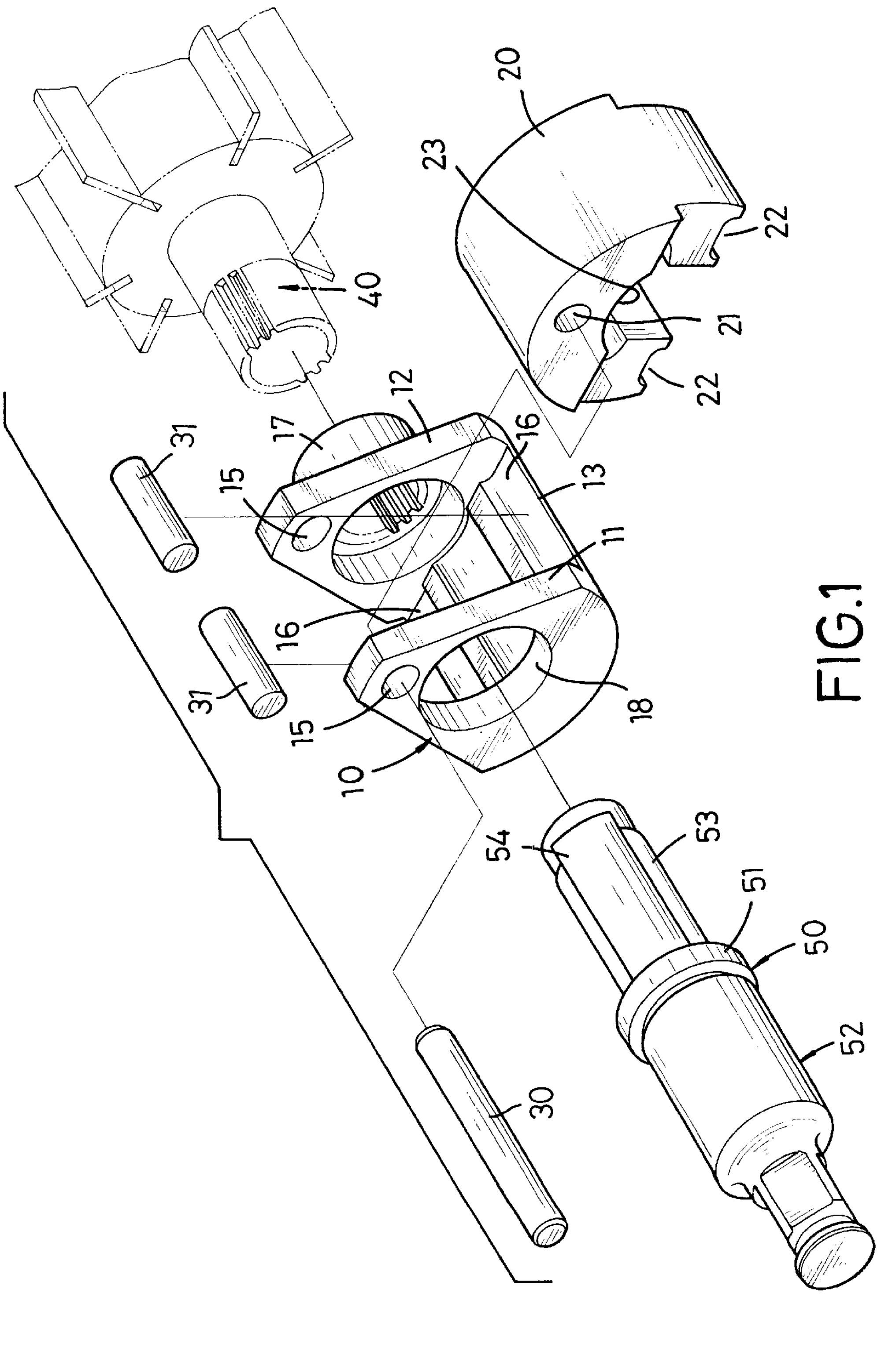
FIG. 1 is an exploded perspective view of an impact device in accordance with the present invention.
Figure 2:
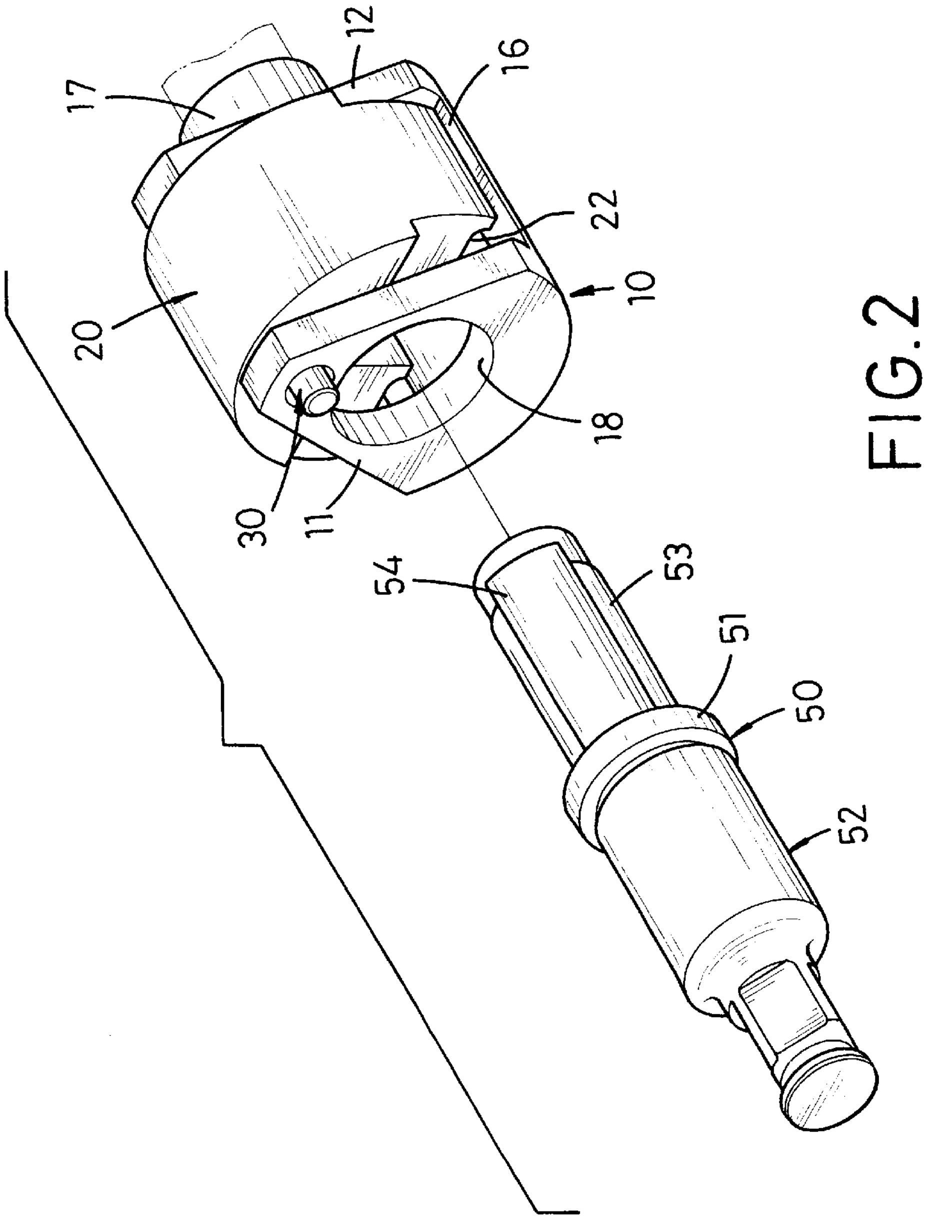
FIG. 2 is an exploded perspective view of the output axle and the carrier of the impact device in FIG. 1.

With reference to FIGS. 1 and 2, an impact device for a pneumatic tool in accordance with the present invention comprises a carrier (10), a hammer (20), a pivot pin (30), two hammer pins (31) and an output axle (50). The carrier (10) is adapted to be connected to a rotor (40) and has a bridge (13) and two walls (11,12). Two depressions (16) are respectively defined in two sides of the top of the bridge (13). The walls (11) respectively extend from two ends of the bridge (13). A central hole (18) is defined through one of the walls (11), and a connecting sleeve (17) with a keyed hole formed on the other wall (12). The keyed hole in the connecting sleeve (17) is engaged with a keyed shaft of the rotor (40) so as to make the carrier (10) rotate with the rotor (40). An elongated hole (15) is defined through each respective wall (11,12) and the elongated holes (15) align with each other. The hammer (20) is pivotally mounted in the carrier (10) between the walls (11,12). Two legs (not numbered) respectively extend from two sides of the bottom of the hammer (20) to define a recess (23) with an opening between the bottom and the legs. A cavity (22) is defined in the free end of each respective leg and corresponds to one of the depressions (16) in the top of the bridge (13). An impact protrusion (24) is formed on each respective leg at a side facing the other leg to narrow the opening of the recess (23). A pivot hole (21) is defined through the hammer (20) and aligns with the elongated holes (15) in the walls (11,12) of the carrier (10).

The pivot pin (30) extends through the elongated holes (15) in the walls (11,12) of the carrier (10) and the pivot hole (21) in the hammer (20) to pivotally connect the hammer (20) to the carrier (10). Two ends of the pivot pin (30) are slidably received in the elongated holes (15) in the walls (11,12) respectively.

Each hammer pin (31) is moveably received in one of the depressions (16) in the top of the bridge (13) and the corresponding cavity (22) in the hammer (20) and is squeezed between the inner surfaces of the corresponding depression (16) cavity (22).

The output axle (50) is inserted into the carrier (10) through central hole (18) in the wall (11) of the carrier (10). The output axle (50) has a middle portion and a flange (51). The flange (51) is formed on the middle portion and is received in the central hole (18) in the wall (11) of the carrier (10) to divide the output axle (50) into an inserted portion (53) and an exposed portion (52) at two sides of the flange (51). The inserted portion (53) of the output axle (50) is received in the recess (23) in the hammer (20), and the exposed portion (52) is exposed from the carrier (10). A jaw (54) is longitudinally formed on the inserted portion (53) of the output axle (50) and selectively abuts against one of the impact protrusions (24) on the hammer (20). A tool head sleeve (not shown) is detachably mounted on the exposed portion (52) of the output axle (50).

Figure 3:
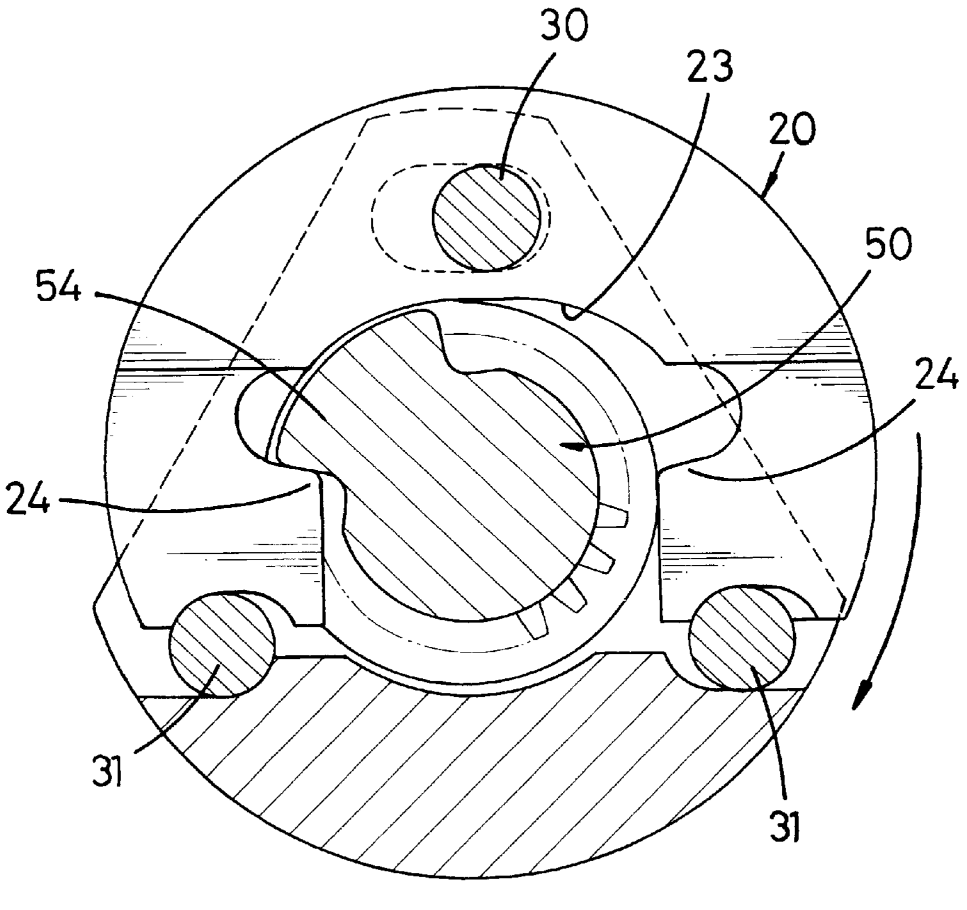
FIG. 3 is an operational front side plan view of the impact device in FIG. 1.

With further reference to FIG. 3, when the rotor (40) is driven by compressed air applied to the pneumatic tool from a pneumatic source, the carrier (10) will rotate with the rotor (40). Because two ends of the pivotal pin (30) are moveably received in the elongated holes (15) in the walls (11,12), the hammer (20) will swing relative to the carrier (10) when the carrier (10) rotates with the rotor (40). The hammer pins (31) will be squeezed between the inner surfaces of the depressions (16) and the cavities (22), such that the hammer (20) will rotate with the carrier (10) by the transmission of the hammer pins (31). Meanwhile, one of the impact protrusions (24) will abut against the jaw (54) on the output axle (50). Consequently, the output axle (50) will be driven to rotate with the carrier (10) in a direction, such that the tool head sleeve on the output axle will be rotated to tighten or loosen a fastener.

Figure 4:
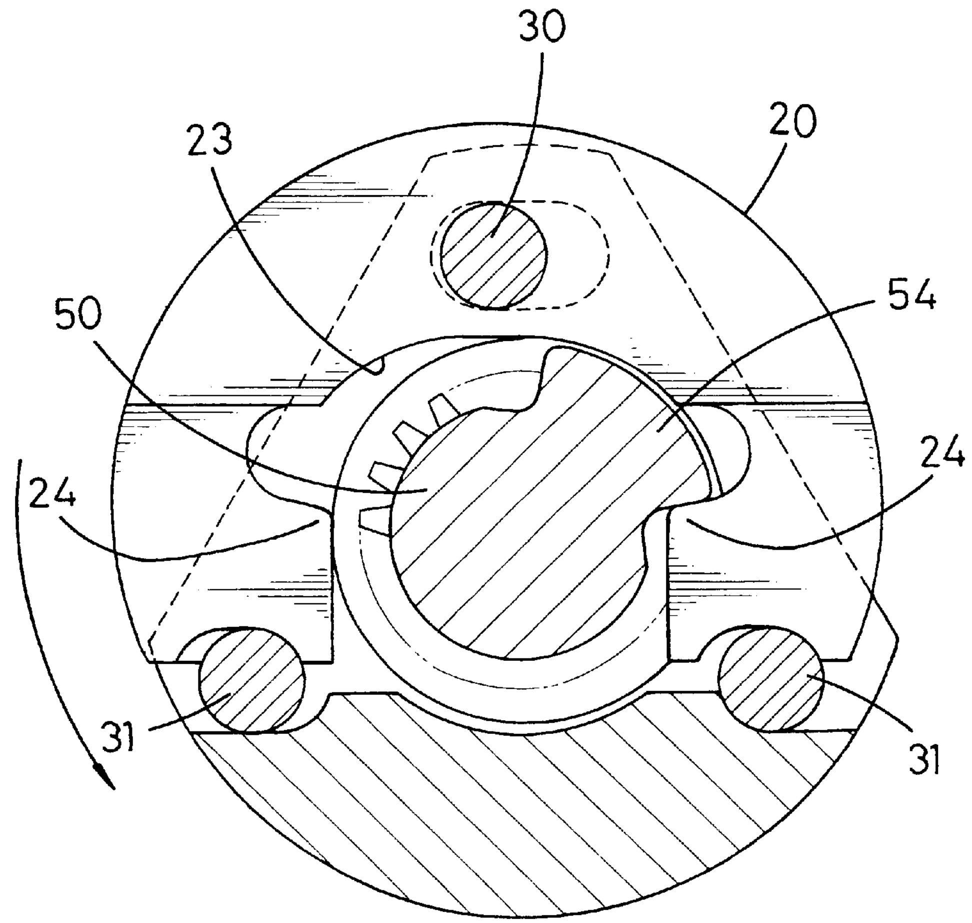
FIG. 4 is another operational front side plan view of the impact device in FIG. 1.
Figure 5:
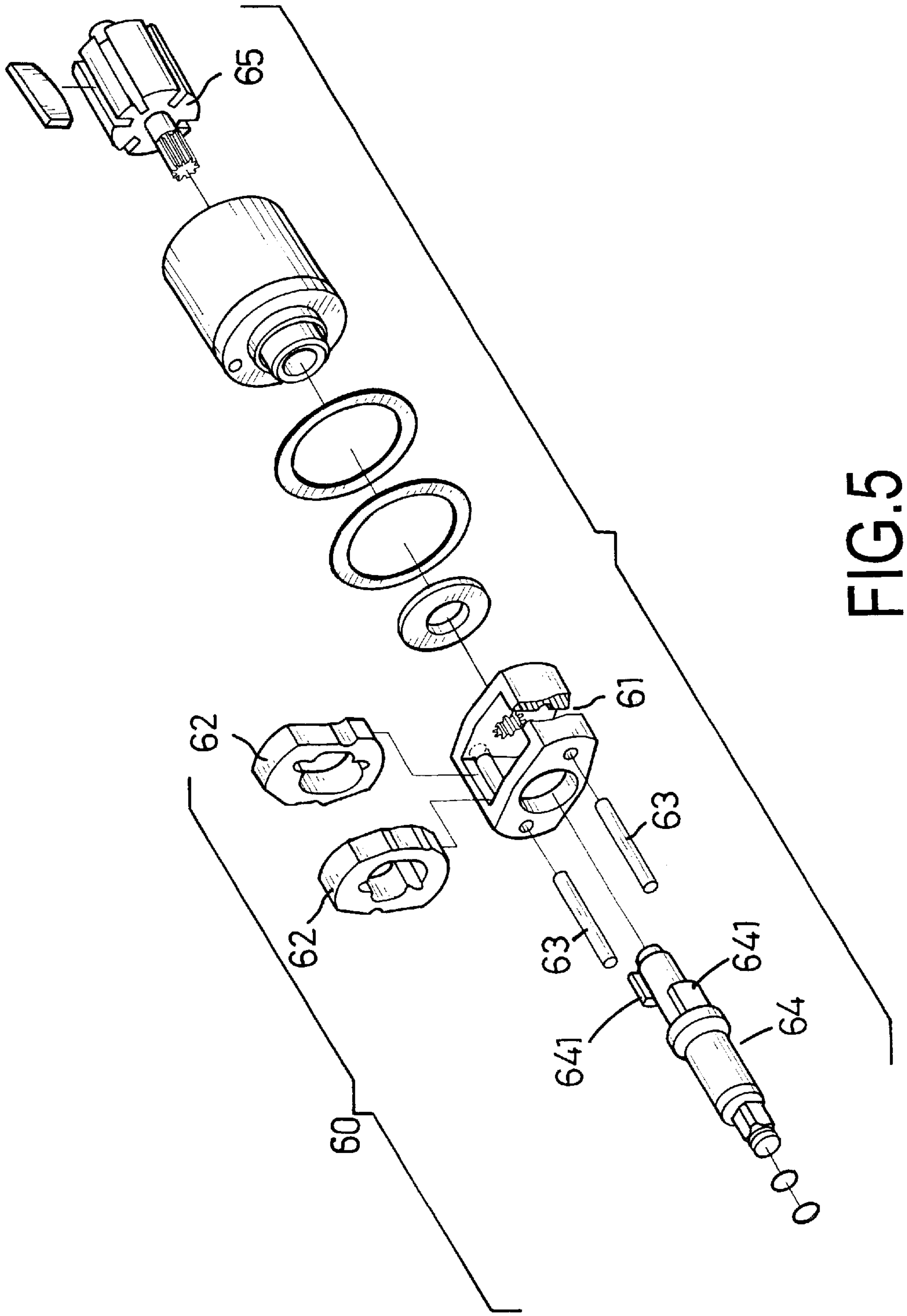
FIG.5 PRIOR ART
FIG. 5 is an exploded perspective view of a conventional impact device in accordance with the prior art.
Figure 6:
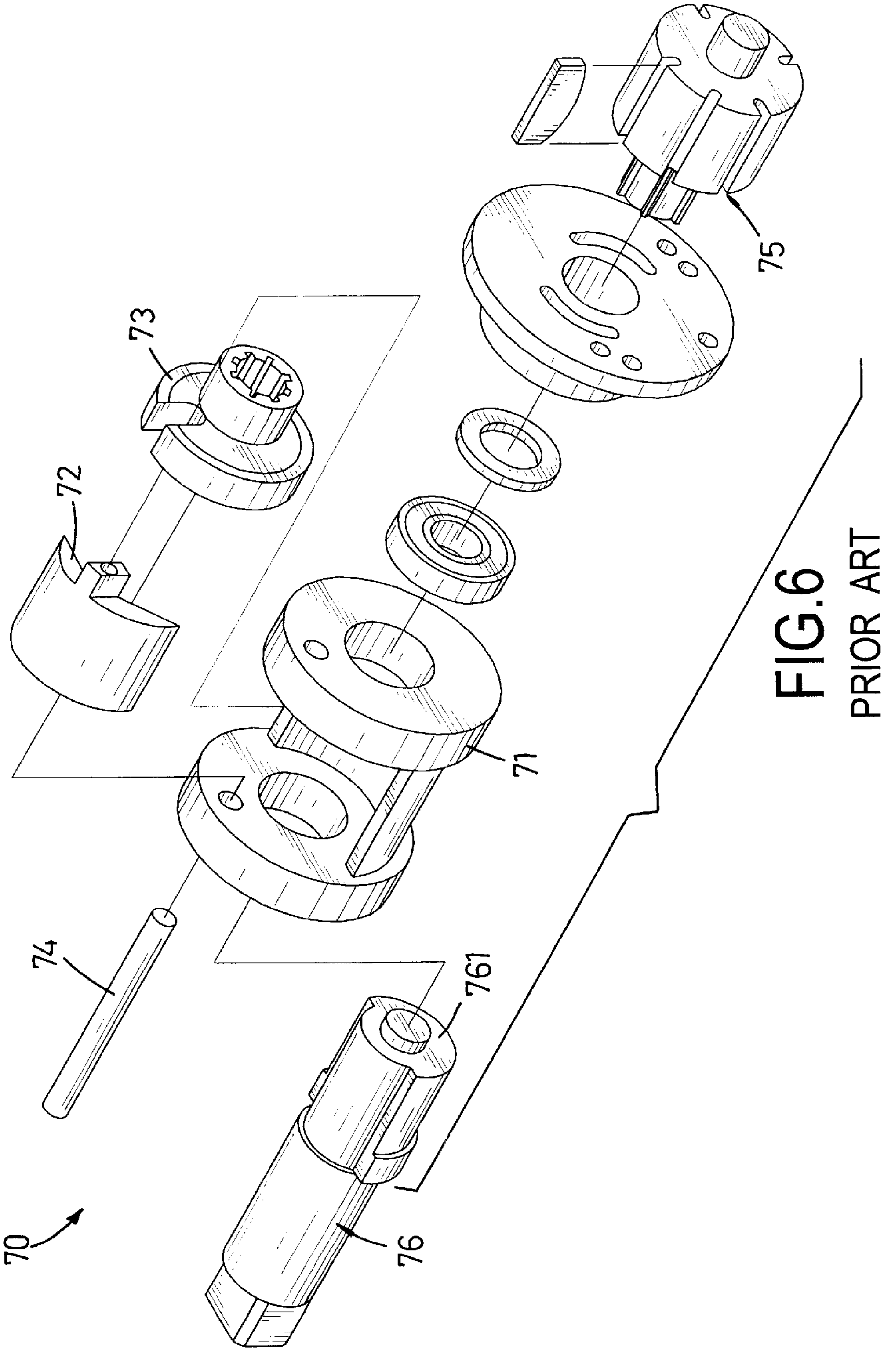
FIG.6 PRIOR ART
FIG. 6 is an exploded perspective view of another conventional impact device in accordance with the prior art.

With reference to FIG. 4, when the rotor (40) is driven to rotate in a reverse direction relative to the previous direction, the hammer (20) will swing relative to the carrier (10) in reverse. The jaw (54) on the output axle (50) will abut against the other impact protrusion (24) on the hammer (20). Consequently, the output axle (40) will be rotated in a reverse direction to loosen or tighten a fastener.

With such an impact device, both of the hammer pins (31) can bear the load applied to or supplied from the output axle (50) during the operation of the impact device and thus the hammer pins (31) are not easily damaged and broken. The impact device in accordance with the present invention has a durable structure, and the useful life of the impact device is prolonged.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An impact device for a pneumatic tool having a rotor, the impact device comprising:

a carrier adapted to be connected to the rotor and having:

a bridge with a first end, a second end and a top with two sides and having a depression defined in each respective side of the top;

a first wall formed on the first end of the bridge and having a central hole defined through the first wall, and a first elongated hole defined through the first wall; and a second wall formed on the second end of the bridge, adapted to be connected to the rotor and having a second elongated hole defined through the second wall and aligning with the first elongated hole in the first wall;

a hammer pivotally mounted in the carrier between the walls and having a bottom with two sides;

two legs respectively extending from the sides of the bottom to define a recess with an opening between the bottom and the legs, each leg having a free end;

a cavity defined in the free end of each respective leg and corresponding to one of the depressions in the top of the bridge;

an impact protrusion formed on each respective leg at a side facing the other leg to narrow the opening of the recess; and a pivot hole defined through the hammer and aligning with the elongated holes in the walls of the carrier;

a pivot pin extending through the elongated holes in the walls of the carrier and the pivot hole in the hammer to pivotally connect the hammer to the carrier;

a hammer pin moveably received in each respective depression in the top of the bridge and the corresponding cavity in the hammer;

an output axle inserted into the central hole in the first wall of the carrier and having an inserted portion received in the recess in the hammer and an exposed portion exposed from the carrier, and the output axle having a jaw longitudinally formed on the inserted portion of the output axle and selectively abutting against one of the impact protrusions on the hammer.

2. The impact device as claimed in claim 1 further comprising a connecting sleeve with a keyed hole formed on the second wall of the carrier to be adapted to connect with the rotor.

3. The impact device as claimed in claim 1, wherein the output axle has a middle portion and a flange formed on the middle portion and received in the central hole in the first wall of the carrier to divide the output axle into the inserted portion and the exposed portion respectively at two sides of the flange.

* * * * *